United States Patent
Pliego (10) Patent No.: US 10,967,806 B2
(45) Date of Patent: Apr. 6, 2021

(54) PASSENGER COMPARTMENT CELL PHONE HOLDER STRUCTURE

(71) Applicant: Nissan North America, Inc., Franklin, TN (US)

(72) Inventor: Paulo Pliego, Metepec (MX)

(73) Assignee: Nissan North America, Inc., Franklin, TN (US)

( * ) Notice: Subject to any disclaimer, the term of this patent is extended or adjusted under 35 U.S.C. 154(b) by 21 days.

(21) Appl. No.: 16/369,571

(22) Filed: Mar. 29, 2019

(65) Prior Publication Data

US 2020/0307466 A1    Oct. 1, 2020

(51) Int. Cl.
*B60R 11/02* (2006.01)
*B60R 16/02* (2006.01)
*B60R 11/00* (2006.01)

(52) U.S. Cl.
CPC .......... *B60R 11/0241* (2013.01); *B60R 16/02* (2013.01); *B60R 2011/0007* (2013.01)

(58) Field of Classification Search
CPC .............. B60R 7/05; B60R 2011/0005; B60R 11/0241; B60R 16/02; B60R 2011/0007
USPC ....................................................... 296/37.12
See application file for complete search history.

(56) References Cited

U.S. PATENT DOCUMENTS

| | | | |
|---|---|---|---|
| 9,630,564 B1 | 4/2017 | Cano | |
| 2011/0156418 A1* | 6/2011 | Thorsell | B60R 7/04 296/24.34 |
| 2014/0203585 A1* | 7/2014 | Sofield | B60R 7/06 296/37.12 |

FOREIGN PATENT DOCUMENTS

DE         202019100008    * 3/2019

* cited by examiner

*Primary Examiner* — Joseph D. Pape
(74) *Attorney, Agent, or Firm* — Global IP Counselors, LLP (57) ABSTRACT

A cell phone holder structure includes a first part and a second part. The first part defines a downwardly facing recessed area. The second part is located below the first part and defines at least a first recessed area and a second recessed area. A first mobile device has a first dimension that allows the first mobile device to be inserted and retained between the first recessed area and the downwardly facing recessed area. A second mobile device has a second dimension greater than the first dimension that allows the second mobile device to be inserted and retained between the second recessed area and the downwardly facing recessed area. A display of the one of the first and second mobile devices set between the first part and the second part is viewable by a vehicle operator seated within the passenger compartment.

17 Claims, 9 Drawing Sheets

FIG. 18

PASSENGER COMPARTMENT CELL PHONE HOLDER STRUCTURE

BACKGROUND

Field of the Invention

The present invention generally relates to cell phone holder structure installed within a passenger compartment of a vehicle. More specifically, the present invention relates to cell phone holder structure that retains any of a plurality of cell phones of differing sizes such that a display of any of the plurality of cell phones is visible to a vehicle operator when supported within the cell phone holder structure.

Background Information

Many vehicle operators use a mobile communication device (for example, a cell phone or GPS) while driving. In many municipalities, all mobile communications conducted by a vehicle operator must be performed hands free so that the vehicle operator can focus on operating the vehicle. Currently, many vehicle operators purchase cell phone support mechanisms and insert them into, for example, a cup holder recess in order to position the mobile communication device near the vehicle operator. Such mechanisms utilize space within the passenger compartment of the vehicle that is meant for other purposes.

SUMMARY

One object of the present disclosure is to provide a vehicle with a structure that supports and retains any of a plurality of different sized mobile communication devices such that the display of the utilized mobile communication device is visible to the vehicle operator.

In view of the state of the known technology, one aspect of the present disclosure is to provide a passenger compartment of a vehicle with a cell phone holder structure that includes a support structure, a first part and a second part. The support structure is located within the passenger compartment of the vehicle. The first part is supported to the support structure defining a downwardly facing recessed area. The second part is supported to the support structure below the first part defining a plurality of upwardly facing recessed areas, including at least a first recessed area and a second recessed area. The first recessed area and the downwardly facing recessed area are vertically spaced apart from one another by a first distance. The second recessed area and the downwardly facing recessed area are vertically spaced apart from one another by a second distance greater than the first distance. The first distance is dimensioned such that a first mobile device having a first length is insertable and retainable between the first recessed area and the downwardly facing recessed area. A second mobile device having a second length greater than the first length is insertable and retainable between the second recessed area and the downwardly facing recessed area such that a display of one of the first and second mobile devices set between the first part and the second part is viewable by a vehicle operator seated within the passenger compartment.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
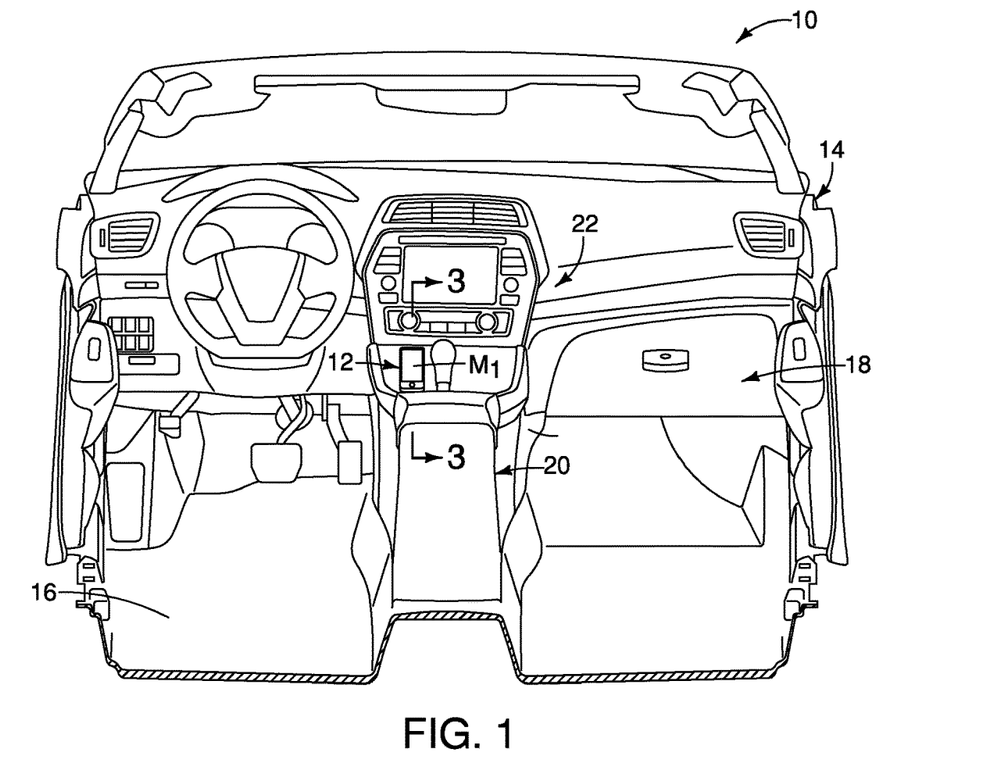
FIG. 1 is a perspective view of a passenger compartment of a vehicle showing a mobile communication device or cell phone showing display thereof held within a cell phone holder structure in accordance with a first embodiment.

Referring initially to FIG. 1, a vehicle 10 having a cell phone holder structure 12 with a cell phone $M_1$ placed therein, is illustrated in accordance with a first embodiment.

As shown in FIG. 1, the vehicle 10 includes vehicle body structure 14 having a floor structure 16 that at least partially defines a passenger compartment 18 within the vehicle body structure 14, a center console structure 20 attached to the floor structure 16 within the passenger compartment 18 and an instrument panel 22 installed to the vehicle 10 within the passenger compartment above the center console structure 20 (also referred to herein below as the center console 20). Since vehicle body structures, floor structures, center console structures, and instrument panels are conventional structures of vehicles, further description is omitted for the sake of brevity.

The cell phone holder structure 12 is attached to one of a forward upper area of the center console structure 20 or a lower central area of the instrument panel 22. Alternatively, the cell phone holder structure 12 can be attached to both the center console structure 20 and the instrument panel 22. The attachment of the cell phone holder structure 12 depends upon the overall design of one or more of the center console structure 20, the instrument panel 22 or the cell phone holder structure 12. Hence, either one or both of the center console structure 20 and/or the instrument panel 22 defines a support structure that supports the cell phone holder structure 12 and that the cell phone holder structure 12 can be attached. The cell phone holder structure 12 is installed and attached to the corresponding support structure via any one or more of mechanical fasteners (not shown), an adhesive material or snap-fitting attachments, or combinations thereof.

Figure 2:
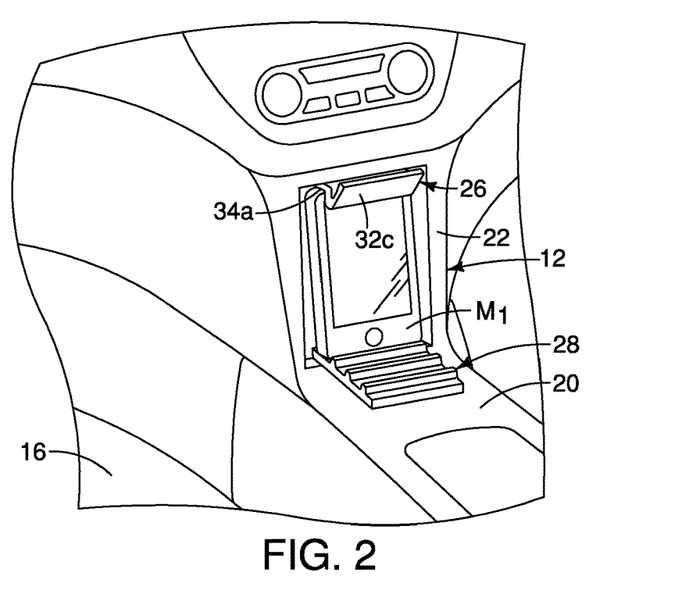
FIG. 2 is another perspective view of a support structure that includes a center console structure and an instrument panel with the cell phone holder structure installed to the support structure in accordance with the first embodiment.
Figure 3:
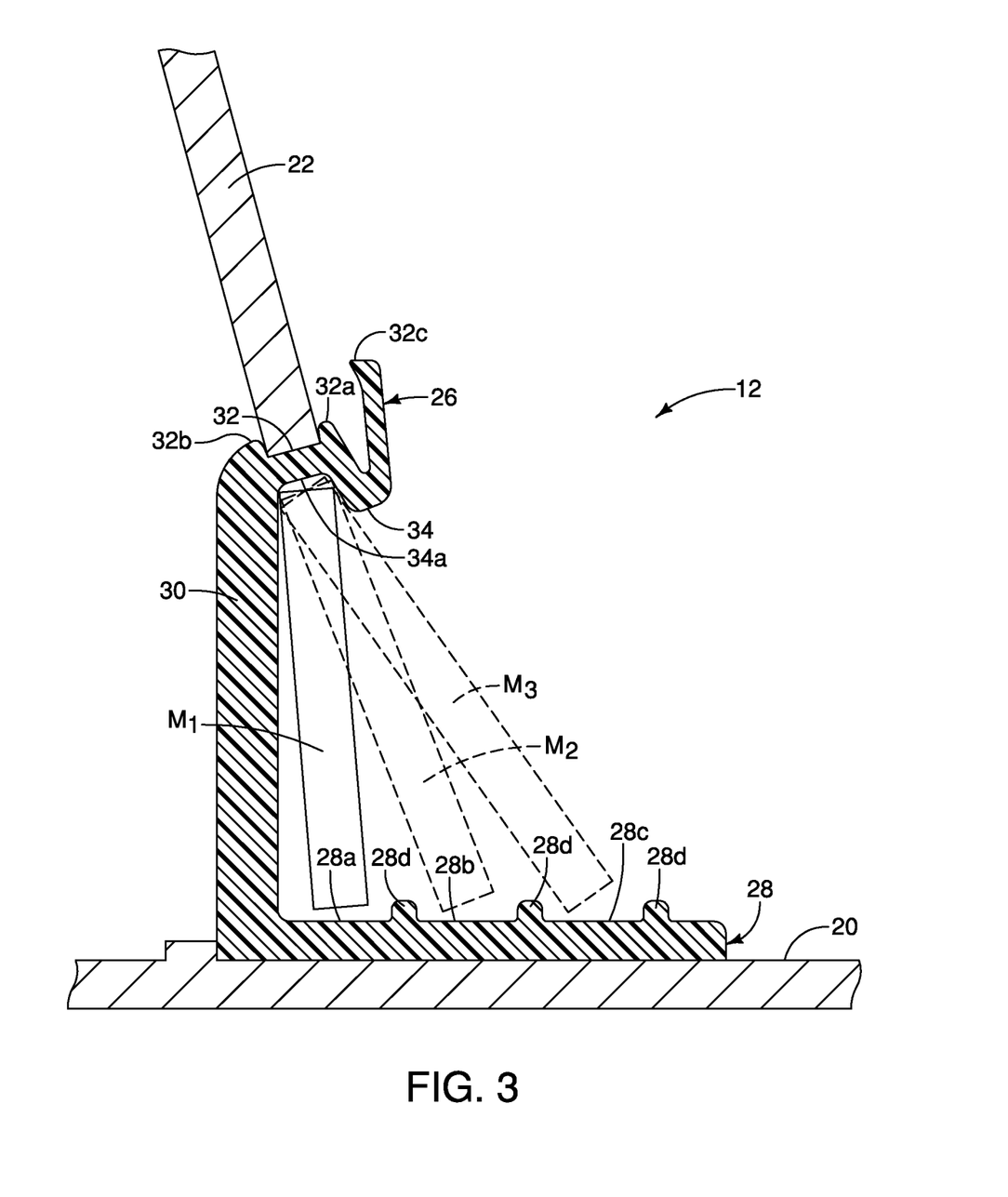
FIG. 3 is a cross-sectional view of the support structure and the cell phone holder structure taken along the line 3-3 in FIG. 1, showing holding positions of each of a plurality of mobile communication devices having differing overall dimensions in accordance with the first embodiment.

In a first embodiment shown in FIGS. 1-3, the cell phone holder structure 12 has an overall C-shape as viewed from the side, that has a first part 26, a second part 28 and a main part 30. As shown in FIG. 3, the first part 26 has an upper surface 32 and a lower surface 34. The upper surface 32 has retaining ridges 32a and 32b that extend upward and are positioned opposite surfaces of a lower end of a panel of the instrument panel 22 preventing movement of the first part 26 relative to the instrument panel 22. The upper surface 32 also includes a lip or flange 32c that can be used to aid the insertion and removal of the cell phone $M_1$ from the cell phone holder structure 12. The lower surface 34 has a downwardly facing recessed area 34a. The downwardly facing recessed area 34a is dimensioned to receive and retain the cell phone $M_1$, or either of differing sized cell phones $M_2$ or $M_3$, as discussed in greater detail below.

The second part 28 is supported to the center console 20 (a support structure) below the first part 26. The second part 28 has a rectangular shape, as shown in FIG. 2, and overlays an area of an upper surface of the center console 20. A bottom surface of the second part 28 can be fixed to the center console 20 via an adhesive or can be fixed to the center console 20 via snap-fitting protrusions (not shown), as described below in a second embodiment.

The second part 28 has an upper surface that defines a plurality of upwardly facing recessed areas 28a, 28b and 28c that are separated by ridges or protrusions 28d. The first recessed area 28a and the downwardly facing recessed area 34a are vertically spaced apart from one another by a first distance $D_1$ that approximately corresponds to the height of the cell phone $M_1$ (see FIG. 4). The second recessed area 28b and the downwardly facing recessed area 34a are vertically spaced apart from one another by a second distance $D_2$ that approximately corresponds to the height of the cell phone $M_2$. The second distance $D_2$ (the approximate height of the cell phone $M_2$) is greater than the first distance $D_1$ (the approximate height of the cell phone $M_1$). Further, the third recessed area 28c and the downwardly facing recessed area 34a are vertically spaced apart from one another by a third distance $D_3$ that approximately corresponds to the height of the cell phone $M_3$. The third distance $D_3$ (the approximate height of the cell phone $M_3$) is greater than the second distance $D_2$ (the approximate height of the cell phone $M_2$).

Figure 4:
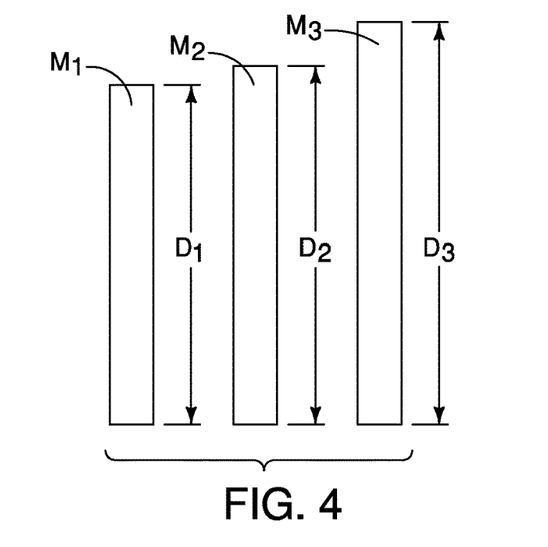
FIG. 4 is a side view of the plurality of mobile communication devices or cell phones showing the relative dimensions between each of the plurality of mobile communication devices in accordance with the first embodiment.

As is clear from FIGS. 3 and 4, the cell phone $M_3$ is taller than the cell phone $M_2$, and the cell phone $M_2$ is taller than the cell phone $M_1$. In other words, the first recessed area 28a and the downwardly facing recessed area 34a are spaced apart from one another such that the cell phone $M_1$ (a first mobile device) having first overall dimensions including a height approximately equal to the distance $D_1$ is insertable and retainable between the first recessed area 28a and the downwardly facing recessed area 34a. Similarly, the second recessed area 28b and the downwardly facing recessed area 34a are spaced apart from one another such that the cell phone $M_2$ (a second mobile device) having second overall dimensions including a height approximately equal to the distance $D_2$ is insertable and retainable between the second recessed area 28b and the downwardly facing recessed area 34a. As well, the third recessed area 28c and the downwardly facing recessed area 34a are spaced apart from one another such that the cell phone $M_3$ (a third mobile device) having first overall dimensions including a height approximately equal to the distance $D_3$ is insertable and retainable between the first recessed area 28a and the downwardly facing recessed area 34a.

It should be understood from the drawings and the description herein that the cell phones $M_1$, $M_2$ and $M_3$ can be any of a variety of mobile communication devices or display devices, such as GPS/navigation devices, mobile weather/radar tracking devices, mobile cell phones or mobile tablets.

The main part 30 is thicker than the first part 26 and the second part 28 and extends in an upright or vertical direction therebetween. In the depicted embodiment, the first part 26, the second part 28 and the main part 30 all formed together as a single monolithic member. Further, the first part 26, the second part 28 and the main part 30 can be made of the same material. For example, the first part 26, the second part 28 and the main part 30 can all be formed from a stiff material that has a small amount of elasticity and resiliency, such as a resin material, a polymer material or a plastic material. The first part 26, the second part 28 and the main part 30 are made of a material that is stiff enough to be retained to the support structure (the center console 20 and the instrument panel 22) but have small but sufficient flexibility and resiliency such that the ridges or protrusions 28d of the second part and the lip or flange 32c of the first part 26 allow insertion and removal of any of the cell phones $M_1$, $M_2$ or $M_3$.

Second Embodiment

Figure 5:
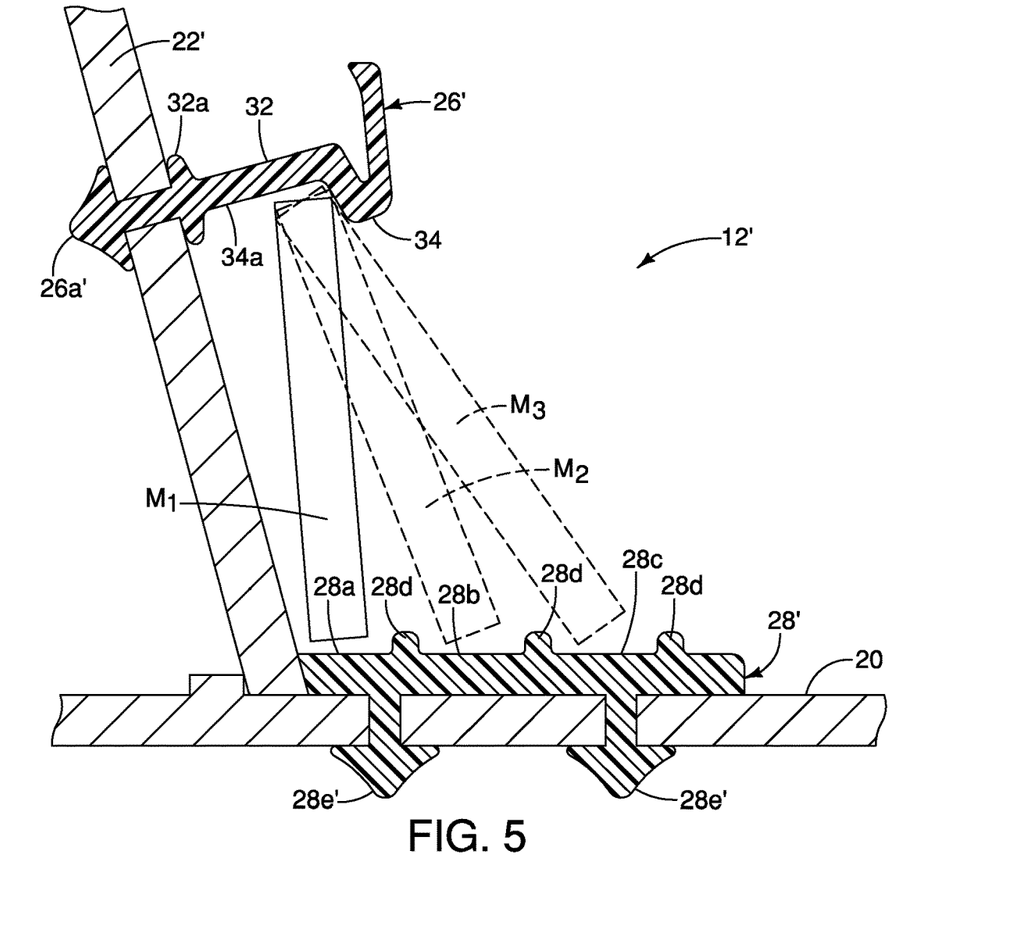
FIG. 5 is a cross-sectional view similar to FIG. 3 of a support structure and a cell phone holder structure showing holding positions of each of the plurality of mobile communication devices in accordance with a second embodiment.

Referring now to FIG. 5, a cell phone holder structure 12' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

In the second embodiment, the cell phone holder structure 12 of the first embodiment has been modified. Specifically, the cell phone holder structure 12' of the second embodiment includes a first part 26' and a second part 28' but does not includes a main part 30 of the first embodiment.

Rather, in the second embodiment, the first part 26' includes a pair of snap-fitting protrusions 26a' (only one snap-fitting protrusions 26a' shown in FIG. 5) that extend through corresponding openings in the instrument panel 22, fixedly attaching the first part 26' thereto. The first part 26' includes the upper surface 32 as described above with respect to the first embodiment. Specifically, the first part 26' includes retaining ridge 32a, the lip or flange 32c, the lower surface 34 and the downwardly facing recessed area 34a as described above with respect to the first embodiment. The second part 28' includes all of the features of the second part 28 of the first embodiment, and additionally includes snap-fitting projections 28e', that attached the second part 28' to the upper surface of the center console 20. Further, the second part 28' includes the upwardly facing recessed areas 28a, 28b and 28c and the ridges or protrusions 28d, as described above with respect to the first embodiment.

Third Embodiment

Figure 6:
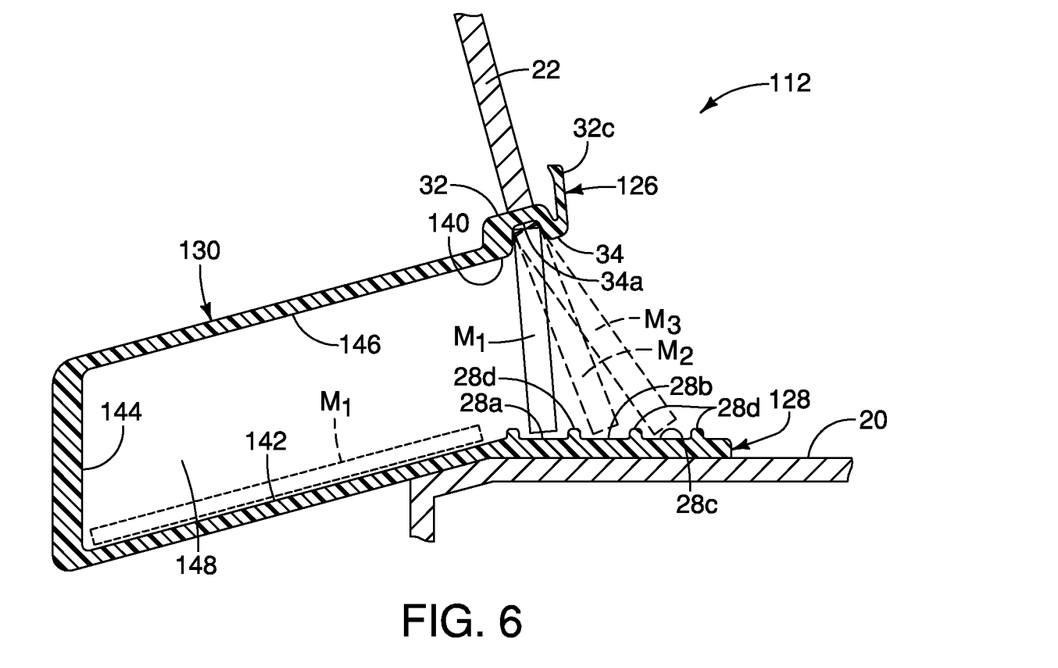
FIG. 6 is a cross-sectional view similar to FIG. 3 showing a portion of a support structure and a cell phone holder structure showing holding positions of each of the plurality of mobile communication devices in accordance with a third embodiment.
Figure 7:
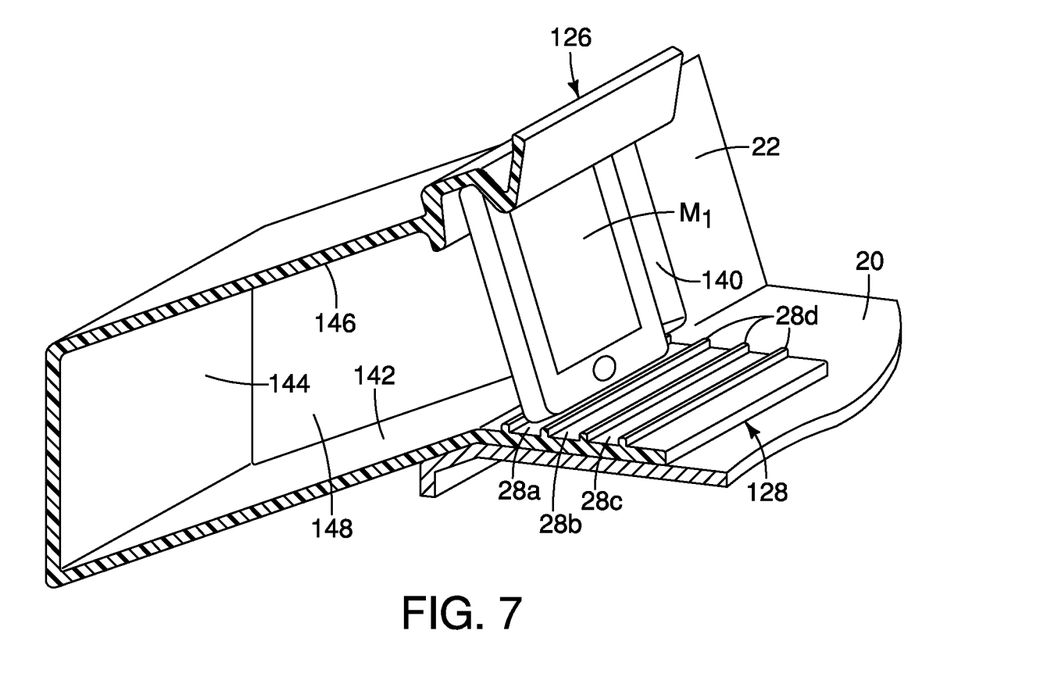
FIG. 7 is a perspective view of the portion of the support structure and the cell phone holder structure shown in FIG. 6 in accordance with the third embodiment.

Referring now to FIGS. 6 and 7, a cell phone holder structure 112 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The cell phone holder structure 112 includes a first part 126, a second part 128 and a compartment 130, described further below. The first part 126 includes many features of the first part 26 of the first embodiment, including the upper surface 32, the lip or flange 32c, the lower surface 34 and the downwardly facing recessed area 34a as described above with respect to the first embodiment. The second part 128 includes all of the features of the second part 28 of the first embodiment including the upwardly facing recessed areas 28a, 28b and 28c and the ridges or protrusions 28d, as described above with respect to the first embodiment.

As well, the first part 126 defines an upper end of an opening 140 of the storage compartment 130. The second part 128 defines a lower end of the opening 140 of the storage compartment 130. The storage compartment 130 is supported to the support structure (one or both of the center console 20 and/or the instrument panel 22. The storage compartment is dimensioned to receive any one of the cell phones $M_1$, $M_2$ or $M_3$ (the first mobile device, the second mobile device or the third mobile device). The storage compartment 130 has a bottom wall 142 (a lower panel), a forward wall 144 (a forward panel), a top wall 146 (a top panel) and a pair of side walls 148 (a pair of side panels—only one side wall 148 is depicted in the drawings). The top wall 146 can be integrally formed with the first part 126, or, can be separately formed and assembled to the first part 126. Similarly, the bottom top wall 142 can be integrally formed with the second part 128, or, can be separately formed and assembled to the second part 128.

Fourth Embodiment

Figure 8:
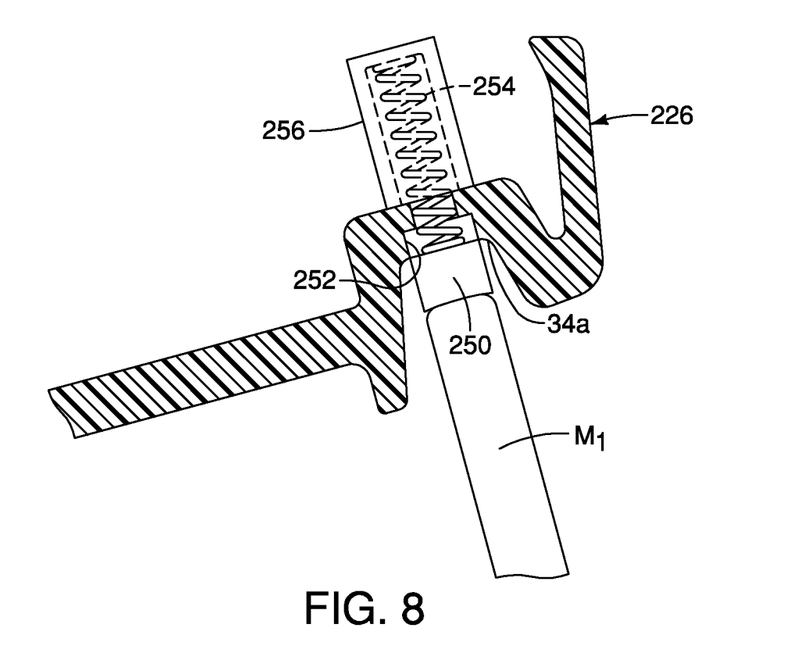
FIG. 8 is a cross-sectional view of a portion of a cell phone holder structure having a biasing spring that contacts an upper end of a mobile communication device held in the cell phone holder structure in accordance with a fourth embodiment.

Referring now to FIG. 8, a cell phone holder structure 212 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

In the fourth embodiment, the cell phone holder structure 212 includes a first part 226 and all other parts of the cell phone holder structure 112 of the third embodiment. (including the second part 126—not shown in FIG. 8). The first part 226 includes all the features of the first part 126 of the third embodiment. However, in the fourth embodiment, the first part 126 has been modified to include an elastic block 250, a bore 252, and a biasing spring 254 supported within a housing 256. The housing 256 is fixed to the upper surface of the first part 226. The biasing spring 254 has an upper end fixed to the housing 256. The biasing spring 254 further extends through the two diameter bore 252 contacting the elastic block 250, which is disposed within the downwardly facing recessed area 34a. The block 250 is positioned and configured to contact an upper end of the cell phone $M_1$ such that the cell phone $M_1$ is provided with a retaining force that prevents movement of the cell phone $M_1$ when located within the cell phone holder structure 212. The biasing effect of the biasing spring 254 also provides a firmness when it comes to positioning and removing of the cell phone $M_1$ from the cell phone holder structure 212.

Fifth Embodiment

Figure 9:
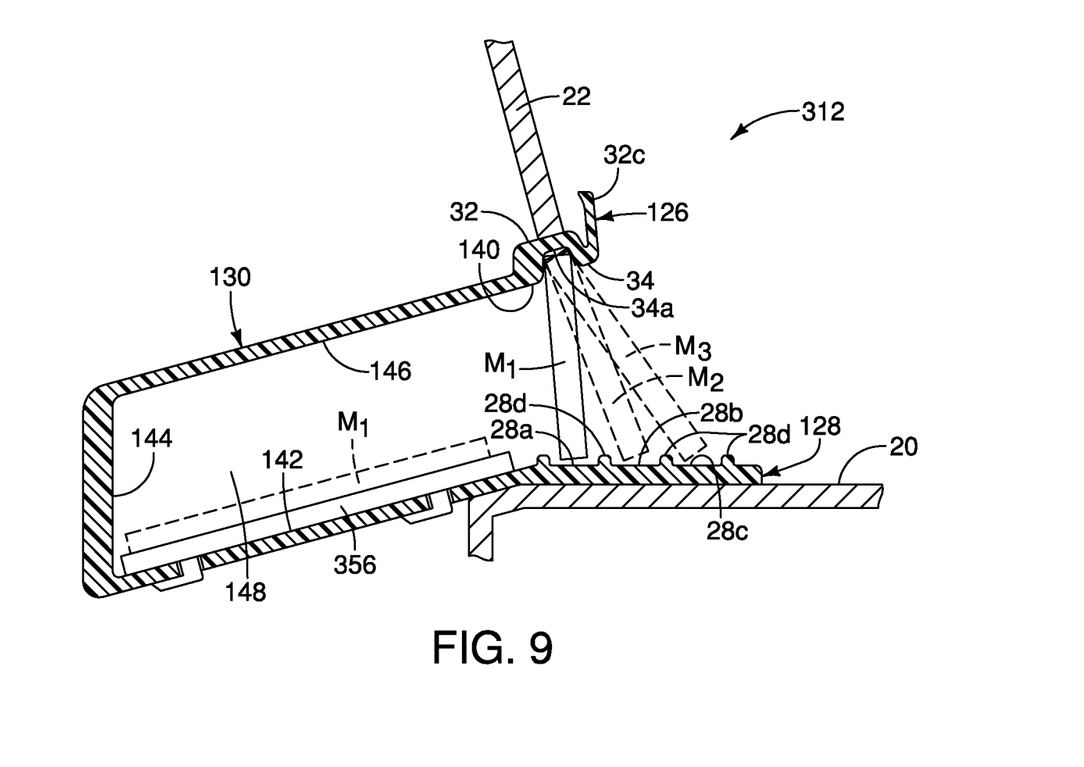
FIG. 9 is a cross-sectional view similar to FIGS. 3 and 6 showing a portion of a support structure and a cell phone holder structure showing holding positions of each of the plurality of mobile communication devices with a storage compartment defined within the cell phone holder structure having a cordless charging device installed to the storage compartment, the cordless charging device and the storage compartment being dimensioned to receive any one of the plurality of mobile communication device for battery charging in accordance with a fifth embodiment.

Referring now to FIG. 9, a cell phone holder structure 312 in accordance with a fifth embodiment will now be explained. In view of the similarity between the first, third and fifth embodiments, the parts of the fifth embodiment that are identical to the parts of the first or third embodiments will be given the same reference numerals as the parts of the first or third embodiments. Moreover, the descriptions of the parts of the fifth embodiment that are identical to the parts of the first or third embodiments may be omitted for the sake of brevity.

In the fifth embodiment, the cell phone holder structure 312 includes the first part 126, the second part 128 and the compartment 130, as described in the third embodiment. The first part 126 includes the upper surface 32, the lip or flange 32c, the lower surface 34 and the downwardly facing recessed area 34a as described above with respect to the first and third embodiments. The second part 128 includes the upwardly facing recessed areas 28a, 28b and 28c and the ridges or protrusions 28d, as described above.

As well, the first part 126 defines the upper end of the opening 140 of the storage compartment 130. The second part 128 defines the lower end of the opening 140 of the storage compartment 130. The storage compartment 130 has the bottom wall 142, the forward wall 144, the top wall 146 and the pair of side walls 148 (only one side wall 148 is depicted in the drawings).

A cordless charging device 356 (a battery recharging unit) is installed to the bottom wall 142 such that when any one of the plurality of cell phones $M_1$, $M_2$ or $M_3$ (mobile communication devices) is placed within the storage compartment 130 overlaying the cordless charging device 356, the battery within the one of the plurality of cell phones $M_1$, $M_2$ or $M_3$ can be charged.

Sixth Embodiment

Figure 10:
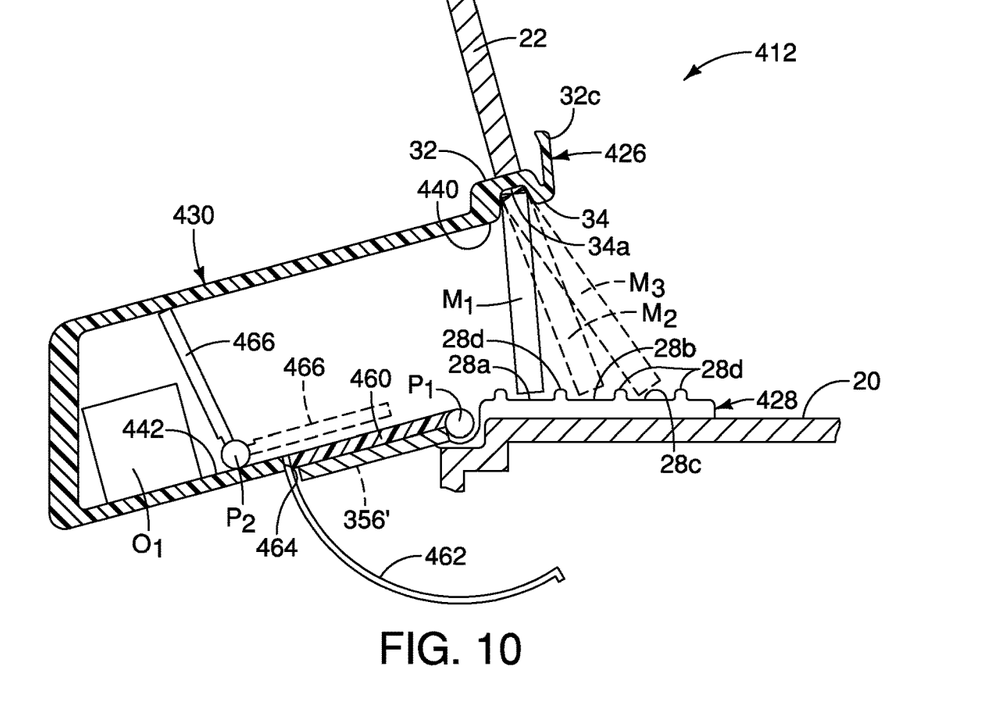
FIG. 10 is a cross-sectional view similar to FIGS. 3, 6 and 9 showing a portion of a support structure and a cell phone holder structure showing holding positions of each of the plurality of mobile communication devices with a storage compartment defined within the cell phone holder structure having a cordless charging device installed to pivoting panel of the storage compartment, the pivoting panel and the cordless charging device being moveable between a retracted orientation and an in-use orientation, and shown in the retracted orientation in accordance with a sixth embodiment.
Figure 11:
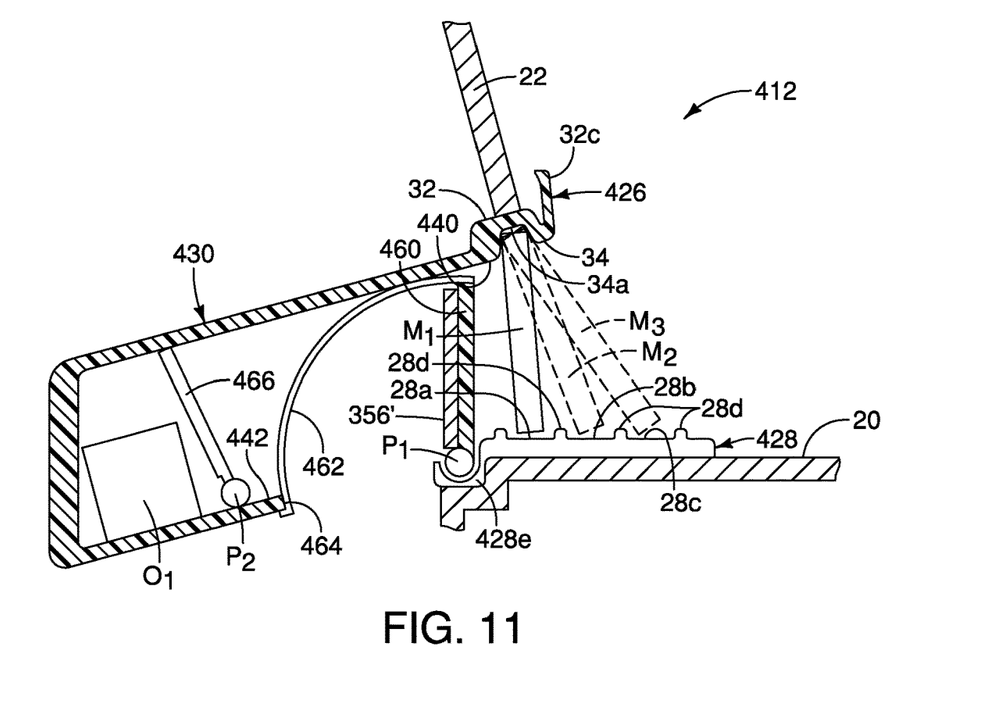
FIG. 11 is a cross-sectional view similar to FIG. 10 showing the portion of the support structure and the cell phone holder structure showing the pivoting panel in the in-use orientation charging the battery of the mobile communication device in accordance with the sixth embodiment.

Referring now to FIGS. 10-11, a cell phone holder structure 412 in accordance with a sixth embodiment will now be explained. In view of the similarity between the first embodiment, the parts of the sixth embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity.

In the sixth embodiment, the cell phone holder structure 412 includes a first part 426, a second part 128 and a compartment 430, described further below. The first part 426 has many features of the first part 26 of the first embodiment, including the upper surface 32, the lip or flange 32c, the lower surface 34 and the downwardly facing recessed area 34a as described above with respect to the first embodiment.

The second part 428 includes all of the features of the second part 28 of the first embodiment including the upwardly facing recessed areas 28a, 28b and 28c and the ridges or protrusions 28d, that receive and hold any one of the plurality of cell phones $M_1$, $M_2$ or $M_3$, as described above with respect to the first embodiment.

As well, the first part 426 defines an upper end of an opening 440 of the storage compartment 430. The second part 428 defines a lower end of the opening 440 of the storage compartment 430. The storage compartment 430 is supported to the support structure (one or both of the center console 20 and/or the instrument panel 22). The first part 426 and the second part 428 are configured to receive any one of the cell phones $M_1$, $M_2$ or $M_3$ (the first mobile device, the second mobile device or the third mobile device), as described above in the first embodiment. The storage compartment 430 has a bottom wall 442 with an opening 464 that receives a pivoting panel 460 (a lower panel) that is moved between a lowered or retracted orientation (FIG. 10) and an upright or in-use orientation (FIG. 11). The pivoting panel 460 includes a cordless charging device 356' (a battery recharging unit) attached thereto for pivoting movement with the pivoting panel 460. A curved panel 462 is attached to the pivoting panel 460 for movement therewith. A pivot structure $P_1$ fixed to one or both of the storage compartment 430 and/or the second part 428 supports the pivoting panel 460 for pivoting movement.

The storage compartment 430 has space to store various objects, such as the object $O_1$. A door 466 pivots about a pivot structure $P_2$ to hide or protect the object $O_1$. The door 466 pivots between an upright orientation (shown in solid lines in FIGS. 10 and 11) and a lowered orientation (shown in phantom lines in FIG. 10). The door 466 must be in the upright orientation in order for the pivoting panel 460 to move to the in-use orientation shown in FIG. 11. In the in-use orientation, the pivoting panel 460 and the cordless charging device 356' are positioned such that the battery of the cell phone $M_1$ can be charged.

Also, with the pivoting panel 460 in the in-use orientation shown in FIG. 11, the curved panel 462 (fixed to the pivoting panel 460 for movement therewith) covers the space occupied by the door 466 and the object $O_1$ preventing any objects from falling into the opening 464 in the bottom panel 442.

Seventh Embodiment

Referring now to FIGS. 12-15, a cell phone holder structure 512 in accordance with a seventh embodiment will now be explained. In view of the similarity between the first embodiment, the parts of the seventh embodiment that are identical to the parts of the first embodiment will be given the same reference numerals as the parts of the first embodiment. Moreover, the descriptions of the parts of the seventh embodiment that are identical to the parts of the first embodiment may be omitted for the sake of brevity.

Figure 12:
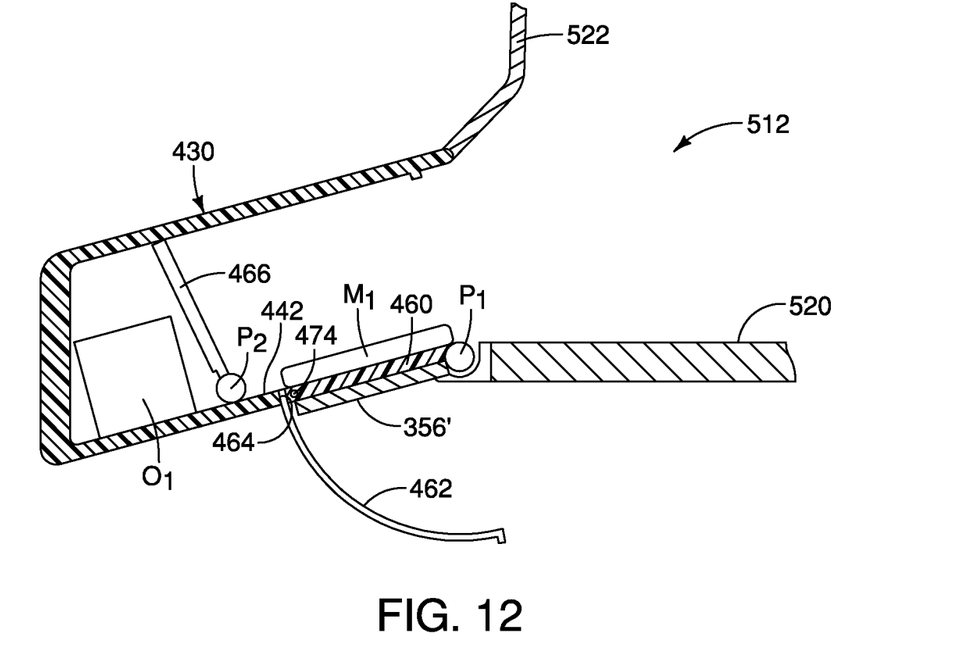
FIG. 12 is a cross-sectional view of a portion of a support structure and a cell phone holder structure showing a storage compartment defined within the cell phone holder structure having a cordless charging device installed to pivoting panel of the storage compartment, the pivoting panel and the cordless charging device being moveable between a retracted orientation and an in-use orientation with the mobile communication device overlaying the cordless charging device and shown in a retracted orientation in accordance with a seventh embodiment.
Figure 13:
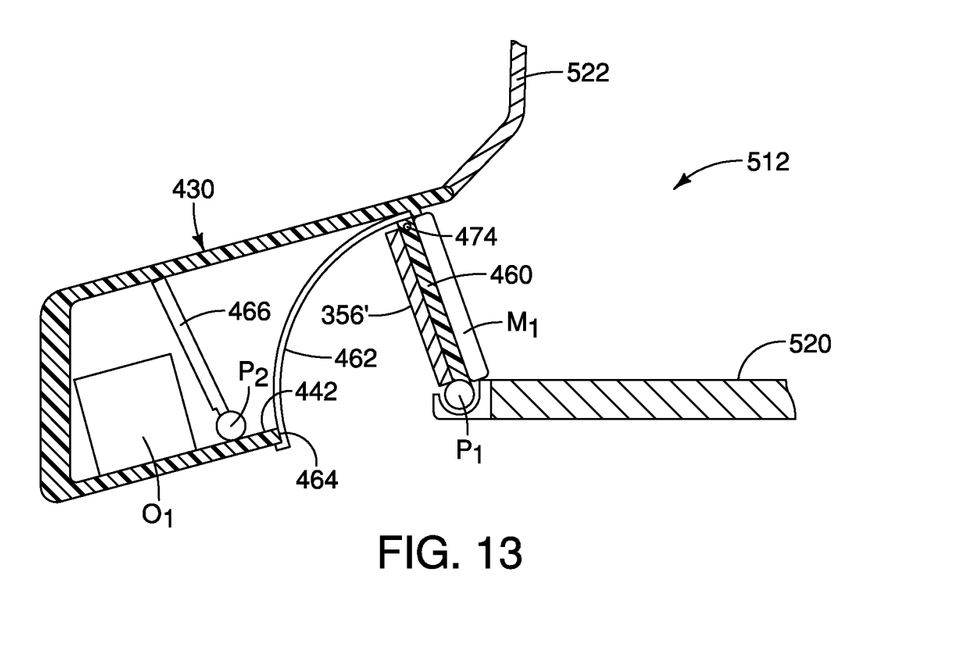
FIG. 13 is another cross-sectional view of the portion of the support structure and the cell phone holder structure depicted in FIG. 12 showing the mobile communication device overlaying the cordless charging device and shown in the in-use orientation in accordance with the seventh embodiment.

In the seventh embodiment, the cell phone holder structure 512 is attached to one or both of a center console 520 and/or an instrument panel 522. The cell phone holder structure 512 includes the storage compartment 430 which is supported to the support structure (one or both of the center console 520 and/or the instrument panel 522). As in the sixth embodiment, the storage compartment 430 has a bottom wall 442 with an opening 464 that receives the pivoting panel 460 (a lower panel) that is moved between a lowered or retracted orientation (FIG. 12) and an upright or in-use orientation (FIG. 13). The pivoting panel 460 includes the cordless charging device 356' (a battery recharging unit) attached thereto for pivoting movement with the pivoting panel 460. A curved panel 462 is attached to the pivoting panel 460 for movement therewith. A pivot structure $P_1$ fixed to one or both of the storage compartment 430 and/or the second part 428 supports the pivoting panel 460 for pivoting movement.

The storage compartment 430 has the space to store various objects, such as the object $O_1$. A door 466 pivots about a pivot structure $P_2$ to hide or protect the object $O_1$. The door 466 pivots between an upright orientation (shown in solid lines in FIGS. 12 and 13) and a lowered orientation (not shown). One of the plurality of cell phones $M_1$, $M_2$ and $M_3$ can be laid on the pivoting panel 460 and moves therewith. In FIGS. 12 and 13, the cell phone $M_1$ is on the pivoting panel 460. Specifically, with the pivoting panel 460 in the retracted orientation (FIG. 12), the cordless charging device 356', the pivoting panel 460 and the cell phone $M_1$ are stored in the storage compartment 430. With the pivoting panel 460 in the in-use orientation (FIG. 13), the cordless charging device 356', the pivoting panel 460 and the cell phone $M_1$ are upright such that the display surface of the cell phone $M_1$ is visible to the vehicle operator. The pivoting door 460 can be provided with retaining tabs (not shown) or magnets that retain the cell phone $M_1$ to the pivoting door 460. Consequently, the first and second parts (first part 26 and the second part 28) are optional and are not required in the seventh embodiment.

Figure 14:
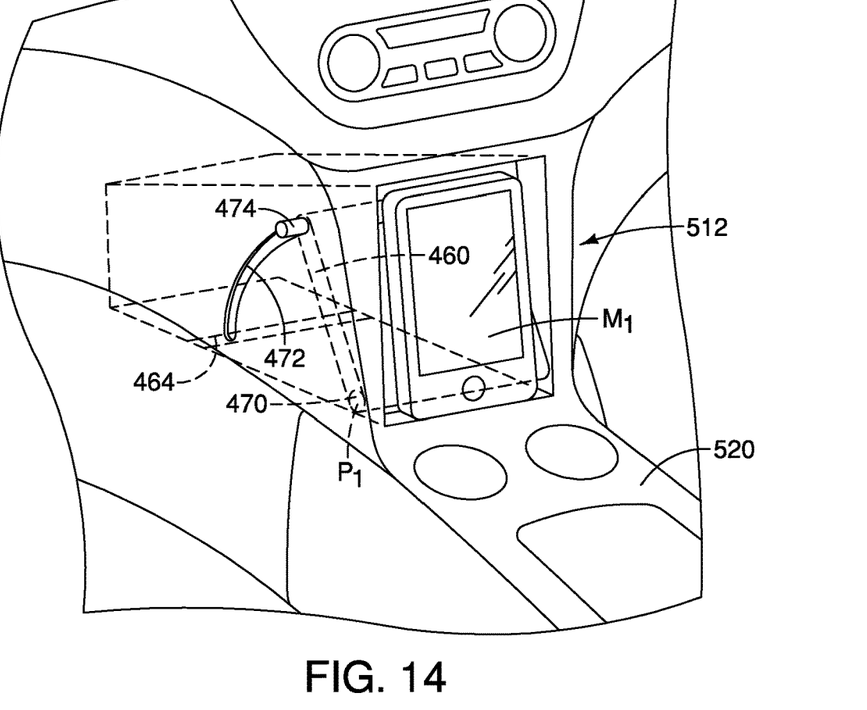
FIG. 14 is perspective view of the portion of the support structure and the cell phone holder structure depicted in FIGS. 12 and 13 showing the mobile communication device overlaying the cordless charging device and shown in the in-use orientation with a pin attached to the pivoting panel for manual movement of the pivoting panel, the cordless charging device and the mobile communication device in accordance with the seventh embodiment.

As shown in FIG. 14, the storage compartment 430 include a side wall with an arcuate shaped slot 472. A pin 474 or rod 474 is attached to the pivoting door 460 (lower panel). The pin 474 extends through extends through the arcuate shaped slot 472. The pin 474 is therefore exposed for use by the vehicle operator to manually move the cordless charging device 356', the pivoting panel 460 and the cell phone $M_1$ between the upright orientation and the lowered orientation.

Figure 15:
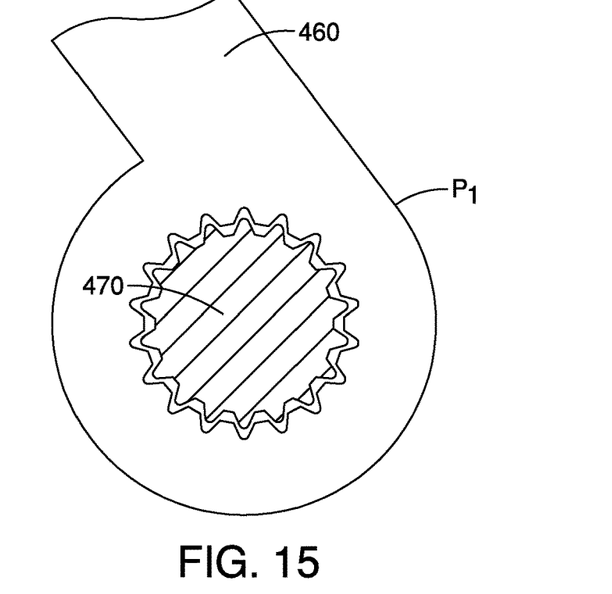
FIG. 15 is a cross-sectional view of a portion of the pivot panel and a friction pivot structure in accordance with the seventh embodiment.

As shown in FIG. 15, the friction pivot structure P1 includes a pivot shaft 470 with friction producing projections that contact an inner surface of a bore at a pivot axis of the pivoting panel 460. Thus, the pivoting panel 460 can be positioned and repositioned to any of a plurality of locations between the upright orientation and the lowered orientation.

Eighth Embodiment

Figure 16:
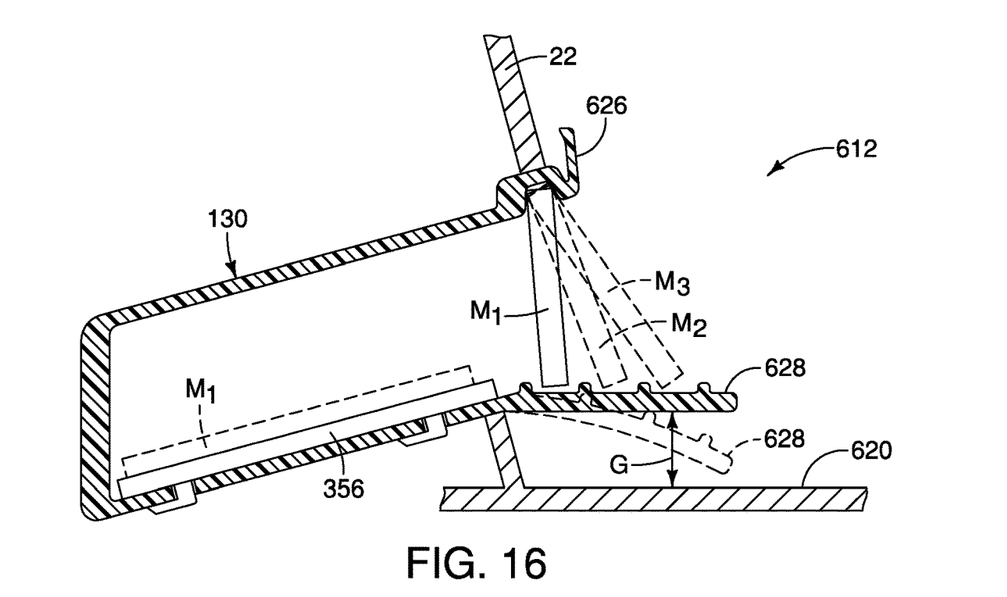
FIG. 16 is a cross-sectional view of a portion of a support structure and a cell phone holder structure showing the storage compartment defined within the cell phone holder structure having a cordless charging device installed to a portion of the storage compartment, with a lower portion of the cell phone holder structure spaced apart from an upper surface of the center console structure in accordance with an eight embodiment.

Referring now to FIG. 16, a cell phone holder structure 612 in accordance with an eighth embodiment will now be explained. In view of the similarity between the first embodiment, the parts of the eighth embodiment that are identical to the parts of the first embodiment will be given the same reference numerals as the parts of the first embodiment. Moreover, the descriptions of the parts of the eighth embodiment that are identical to the parts of the first embodiment may be omitted for the sake of brevity.

In the eighth embodiment, the cell phone holder structure 612 includes a compartment 130 with a cordless charging device 356, a first part 626 that is has all the features of the first part 26, a second part 628 hat has all of the features of the second part 28, as described above.

The cell phone holder structure 612 is installed to a support structure that includes at least one of a center console structure 620 and an instrument panel 622. In the eighth embodiment, cell phone holder structure 612 is installed above the center console structure 620 such that the second part 628 is spaced apart from an upper surface of the center console 620. Further, the second part 628 is made of a flexible and resilient material that allows the second part 628 to bend (phantom lines) and return to a horizontal orientation (solid lines). This flexible characteristic makes inserting and removing the cell phones $M_1$, $M_2$ or $M_3$ easier for the vehicle operator.

Ninth Embodiment

Figure 17:
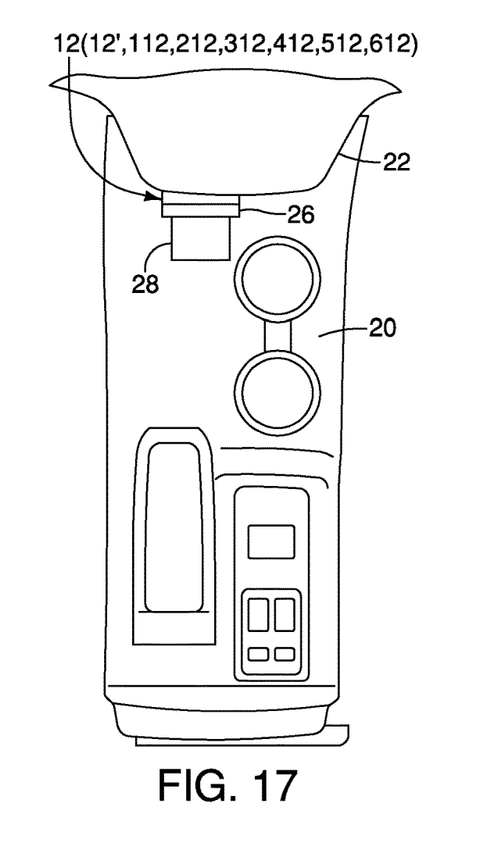
FIG. 17 is a top view of a portion of a support structure and the cell phone holder structures of the first thru eighth embodiments showing the first part and the second part of the cell phone holder structures being parallel to a main surface of the instrument panel in accordance with a ninth embodiment.

Referring now to FIG. 17, the cell phone holder structures 12, 12', 112, 212, 312, 412, 512 and 612 in accordance with a ninth embodiment will now be explained. In view of the similarity between the first thru eighth embodiments, the parts of the ninth embodiment that are identical to the parts of the first thru eighth embodiment will be given the same reference numerals as the parts of the first thru eighth embodiment. Moreover, the descriptions of the parts of the eighth embodiment that are identical to the parts of the first thru eighth embodiments may be omitted for the sake of brevity.

In the ninth embodiment, the cell phone holder structures 12, 12', 112, 212, 312, 412, 512 and 612 are supported by at least one of the center console structure 20 and the instrument panel 22. In the ninth embodiment, the first part 26 and the second part 28 are approximately parallel to the surface of the instrument panel 22.

Tenth Embodiment

Figure 18:
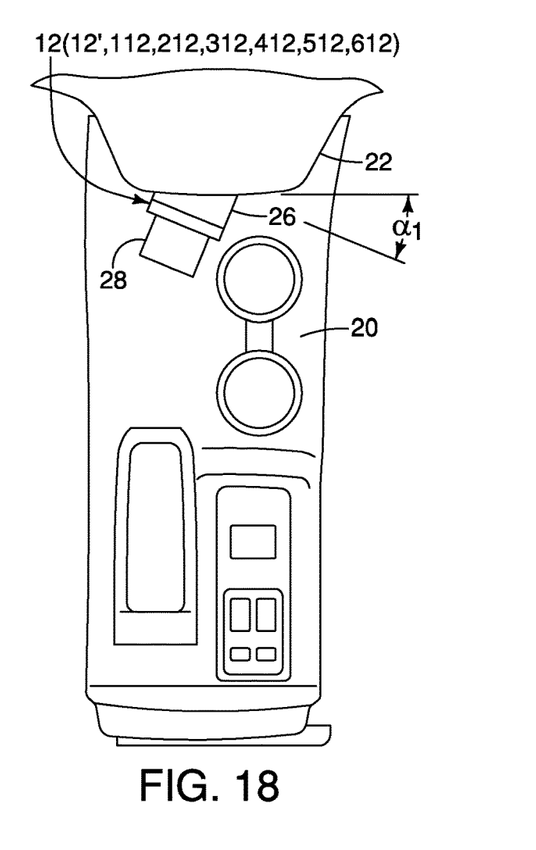
FIG. 18 is a top view of a portion of a support structure and the cell phone holder structures of the first thru eighth embodiments showing the first part and the second part of the cell phone holder structures being angularly offset from the main surface of the instrument panel in accordance with a tenth embodiment.

Referring now to FIG. 18, the cell phone holder structures 12, 12', 112, 212, 312, 412, 512 and 612 in accordance with a tenth embodiment will now be explained. In view of the similarity between the first thru eighth embodiments, the parts of the tenth embodiment that are identical to the parts of the tenth embodiment will be given the same reference numerals as the parts of the first thru eighth embodiment. Moreover, the descriptions of the parts of the tenth embodiment that are identical to the parts of the first thru eighth embodiments may be omitted for the sake of brevity.

In the tenth embodiment, the cell phone holder structures 12, 12', 112, 212, 312, 412, 512 and 612 are supported by at least one of the center console structure 20 and the instrument panel 22. In the tenth embodiment, the first part 26 and the second part 28 are angularly to the surface of the instrument panel 22 by an angle $\alpha_1$. The angle $\alpha_1$ is a value preferably between 10 degrees and 30 degrees. The selected value of the angle $\alpha_1$ is dependent upon the overall design of the vehicle 10 and passenger compartment 18. The angle $\alpha_1$ is selected in order to provide the vehicle operator with an optimal view of the display of the one of the cell phones $M_1$, $M_2$ or $M_3$ held by the cell phone holder structure.

The vehicle includes many conventional elements and components that are well known in the art. Since these elements and components are well known in the art, these structures will not be discussed or illustrated in detail herein. Rather, it will be apparent to those skilled in the art from this disclosure that the components can be any type of structure that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the cell phone holder structure. Accordingly, these terms, as utilized to describe the present invention should be interpreted relative to a vehicle equipped with the cell phone holder structure.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A passenger compartment cell phone holder structure, comprising:
   a support structure within a passenger compartment of a vehicle;
   a first part supported to the support structure defining a downwardly facing recessed area, the first part defining an upper end of an opening of a storage compartment supported to the support structure within the passenger compartment, the storage compartment being dimensioned to receive a first mobile device or a second mobile device; and
   a second part supported to the support structure below the first part defining a lower end of an opening of the storage compartment, the second part further defining a plurality of upwardly facing recessed areas, including at least a first recessed area and a second recessed area, the first recessed area and the downwardly facing recessed area being vertically spaced apart from one another by a first distance, the second recessed area and the downwardly facing recessed area being vertically spaced apart from one another by a second distance greater than the first distance, the first distance being dimensioned such that the first mobile device having first overall dimensions is insertable and retainable between the first recessed area and the downwardly facing recessed area, and the second mobile device having second overall dimension greater than the first overall dimension is insertable and retainable between the second recessed area and the downwardly facing recessed area such that a display of one of the first and second mobile devices is viewable by a vehicle operator seated within the passenger compartment with the one of the first and second mobile devices inserted between the first part and the second part.

2. The passenger compartment cell phone holder structure according to claim 1, wherein
   the storage compartment includes a bottom wall that includes a battery recharging unit.

3. The passenger compartment cell phone holder structure according to claim 1, wherein
   the storage compartment includes the lower panel supported by a pivot structure fixed to the storage compartment proximate a lower end of the opening, the lower panel being configured to pivot between a lowered orientation and an upright orientation such that in the upright orientation the lower panel at least partially covers the opening of the storage compartment.

4. The passenger compartment cell phone holder structure according to claim 3, wherein
   the lower panel includes a battery recharging unit.

5. The passenger compartment cell phone holder structure according to claim 3, wherein
   the storage compartment includes a side wall with an arcuate shaped slot, and
   the lower panel includes a pin fixed to an end of the lower panel spaced apart from the pivot structure, the pin extending through the arcuate shaped slot such that movement of the lower panel is accomplished in response to manual movement of the pin.

6. The passenger compartment cell phone holder structure according to claim 1, wherein
   the first part includes a resilient material with a biasing spring that biases the resilient material in a downward direction within the downwardly facing recessed area.

7. The passenger compartment cell phone holder structure according to claim 1, wherein
   the support structure includes a main surface that extends upward from the first part;
   the first recessed area, the second recessed area and the downwardly facing recessed area are angularly offset from the main surface of the support structure such that with one of the first mobile device or the second mobile device positioned between the first part and the second part, the display of the one of the first mobile device or the second mobile device is angled toward the vehicle operator seated within the passenger compartment.

8. The passenger compartment cell phone holder structure according to claim 1, wherein
   the support structure includes a center console assembly installed to a floor of the vehicle with the second part being located proximate a forward end of the center console assembly.

9. The passenger compartment cell phone holder structure according to claim 8, wherein
   the second part is located above and spaced apart from an upper surface of the center console assembly.

10. The passenger compartment cell phone holder structure according to claim 1, wherein
    the support structure includes an instrument panel installed within the vehicle with the first part being attached to the instrument panel proximate a lower edge thereof.

11. A passenger compartment cell phone holder structure, comprising:
- an instrument panel within a passenger compartment of a vehicle, a surface of the instrument panel defining an opening that is accessed from within the passenger compartment; and
- a storage compartment structure that includes an upper panel, a lower panel attached to the instrument panel at respective upper and lower ends of the opening, the lower panel having a battery recharging unit attached thereto, the upper panel and the lower panel of the storage compartment structure being dimensioned and shaped to receive a mobile device such that the mobile device overlays a section of the lower panel such that a battery of the mobile device is charged by the battery recharging unit, the lower panel being installed to the instrument panel via a pivot structure such that the lower panel pivots between a lower orientation and an upright orientation such that in the lower orientation the lower panel aligns with a bottom wall of the storage compartment structure and in the upright orientation the lower panel at least partially closes the opening of the storage compartment.

12. The passenger compartment cell phone holder structure according to claim 1, wherein:
- the storage compartment structure includes a side wall with an arcuate shaped slot, and
- the lower panel includes a pin fixed to an end of the lower panel spaced apart from the pivot structure, the pin extending through the arcuate shaped slot such that movement of the lower panel is accomplished in response to manual movement of the pin.

13. The passenger compartment cell phone holder structure according to claim 11, wherein:
- the storage compartment structure includes a first part and a second part, the first part being supported to the instrument panel along an upper end of the opening, the first part defining a downwardly facing recessed area, and
- the second part is supported to the instrument panel below the first part defining a plurality of upwardly facing recessed areas, including at least a first recessed area and a second recessed area, the first recessed area and the downwardly facing recessed area being vertically spaced apart from one another by a first distance, the second recessed area and the downwardly facing recessed area being vertically spaced apart from one another by a second distance greater than the first distance, the first distance being dimensioned such that a first mobile device having first overall dimensions is insertable and retainable between the first recessed area and the downwardly facing recessed area, and a second mobile device having second overall dimension greater than the first overall dimension is insertable and retainable between the second recessed area and the downwardly facing recessed area such that a display of one of the first and second mobile devices is viewable by a vehicle operator seated within the passenger compartment with the one of the first and second mobile devices inserted between the first part and the second part.

14. The passenger compartment cell phone holder structure according to claim 13, wherein:
- the first part includes a resilient material with a biasing spring that biases the resilient material in a downward direction within the downwardly facing recessed area.

15. The passenger compartment cell phone holder structure according to claim 13, wherein
- the instrument panel includes a main surface that extends upward from the first part, and
- the first recessed area, the second recessed area and the downwardly facing recessed area are angularly offset from the main surface of the support structure such that with one of the first mobile device or the second mobile device positioned between the first part and the second part, the display of the one of the first mobile device or the second mobile device is angled toward the vehicle operator seated within the passenger compartment.

16. The passenger compartment cell phone holder structure according to claim 13, wherein
- the support structure includes a center console assembly installed to a floor of the vehicle with the second part being located proximate a forward end of the center console assembly.

17. The passenger compartment cell phone holder structure according to claim 16, wherein
- the second part is located above and spaced apart from an upper surface of the center console assembly.

* * * * *